Sept. 15, 1964 A. NAOR 3,148,492
MOWER DRIVE
Filed April 9, 1962
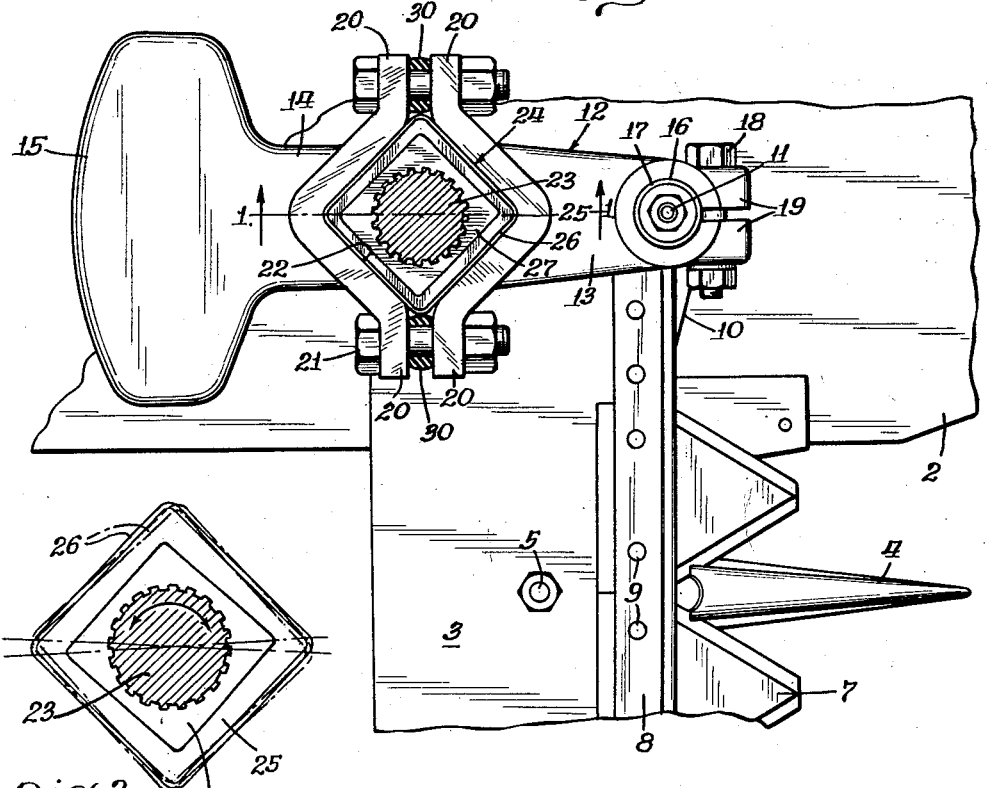
Fig. 2.
Fig. 3.
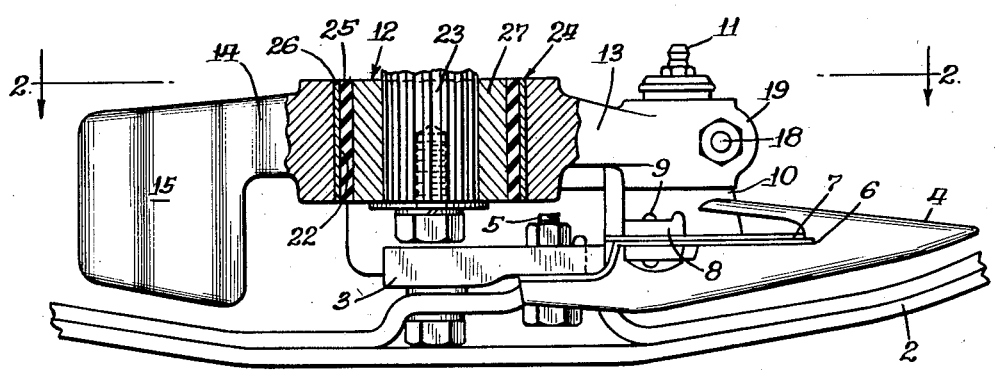
Fig. 1.
Inventor:
Ariel Naor
Paul O. Pippel
Atty.

United States Patent Office 3,148,492
Patented Sept. 15, 1964

3,148,492
MOWER DRIVE
Ariel Naor, Zabala, Israel, assignor to International Harvester Company, Chicago, Ill., a corporation of New Jersey
Filed Apr. 9, 1962, Ser. No. 186,023
7 Claims. (Cl. 56—306)

The present invention relates generally to improvements in balanced mowers and the like, and more particularly to a new and improved adjustable stroke vibration controlled mover.

The patent to Orelind 2,824,416 patented on February 25, 1958, discloses a balanced mower of the type with which this invention could be utilized. This type of mower has proved to be efficient and reliable and has attained a high degree of commercial success. The vertical drive shaft of this machine is integral or rigidly connected to the sickle drive arm and therefore all inertia forces in the sickle drive arm are transferred to the vertical drive shaft. Those concerned with the development of balanced mowers have long recognized the need to reduce these inertia forces in the development of lighter and faster mowers. The present invention fulfills this need.

The general purpose of this invention is to provide a balanced mower which embraces all the advantages of similar balanced mowers and yet can be built lighter, driven faster, and adjusted in several respects which shall be explained in detail. To attain this, the present invention contemplates a flexible drive means between the vertical oscillating shaft and the sickle drive arm.

A further purpose of this invention is to provide a means for throwing a balanced mower slightly out of balance at the end of each sickle stroke. This slight unbalancing at the end of the strokes will allow the sickle to free itself from all cut hay and grass and still maintain the balance during the major portion of the stroke.

An object of the present invention is the provision of flexible drive means to reduce inertia forces in balanced mowers of the type having a vertical oscillating input drive shaft.

Another object is to provide flexible drive means for balanced mowers that will allow slight overtravel at the end of each stroke of the sickle.

A further object of the invention is the provision of flexible means for a balanced mower that will allow the mower to become slightly unbalanced at the end of each sickle stroke.

Still another object of this invention is to provide a flexible drive means for a balanced mower in which means are provided to adjust the flexibility of said drive means.

Yet another object of this invention is to provide a variable stroke drive mechanism for a mower.

A still further object of this invention is to provide a drive mechanism for a mower that will permit the sickle blade to be held stationary while the input drive means continues in its normal motion.

A still further object of this invention is to provide a flexible drive means for a balanced mower that will allow the reversal point of the sickle to be adjusted with respect to the fixed fingers.

FIGURE 1 shows a side view, partially in section, of a preferred embodiment of the invention;

FIGURE 2 illustrates a top view of the apparatus shown in FIGURE 1; and

FIGURE 3 is an isolated showing of the flexible drive means showing its overtravel position in broken lines.

Referring now to the drawing, wherein like reference characters designate like or corresponding parts throughout the several views, there is shown in FIGURE 1 a foundation plate 2, with a mower bar 3 secured thereto, the bar 3 having a plurality of fingers 4 secured thereto. Ledger plate 6 is mounted on fingers 4 and extends coextensively with the mower bar 3. A backing bar 8 having a conventional sickle 7 secured thereto by rivets 9 is mounted for reciprocation in a generally horizontal plane. A backing bar 8 is provided at its forward end with a knifehead 10, said knifehead being provided with a fixed vertical pin 11. The sickle drive arm generally indicated as 12 is formed of two parts, a forward output arm 13 and a rearward arm 14 having an integral counterweight 15. The forward output arm 13 is provided with a vertical opening 16 into which the fixed vertical pin 11 extends. The split in the forward output arm is tightened around a bushing 17 by the transverse bolt 18, thus forming a pivotal connection between the sickle drive arm and the backing bar. The assembled sickle drive arm is provided with a rectangular shaped aperture 22 about its center, said aperture being adapted to receive the flexible drive means 24.

As can be best seen in FIGURE 2, each of the two parts of the sickle drive arm are provided with a pair of lugs 20 extending from said sickle drive arm in a direction normal to the longitudinal axis of said drive arm. Aligned holes are provided in lugs 20 through which bolts 21 pass to secure said two parts of the sickle drive arm together. A flexible washer 30 is carried by bolt 21 between at least one set of lugs 20.

The preferred embodiment of applicant's flexible drive means 24 consists of a rubber bushing 25 which is molded to the internal surface of a thin rigid shell 26, and to the external surface of a square rigid hub 27, said square hub being provided with splines on its internal surface that interlock with the splines on input drive shaft 23, thus, allowing the flexible drive means to slide longitudinally of said drive shaft but preventing it from rotating relative to said shaft. The outer dimensions and shape of the thin rigid shell of said flexible drive means corresponds to the size and shape of the aperture formed in the sickle drive arm. Upon said flexible drive means being inserted in the aperture formed in said sickle drive arm and the two parts of said sickle drive arm being tightened by bolts 21, said thin shell is rigidly fixed to said sickle drive arm. Shell 26 is made of material such as spring steel that will allow it to be deformed and return to its original shape. By adjusting bolts 21 the normal tension of the rubber bushing 25 can be varied, and thus adjust the flexibility of the drive means. Adjustment of bolts 21 will also cause the stroke of the sickle to be changed since as the bolts are tightened and the drive means become less flexible the amount of overtravel is decreased and the stroke length is accordingly altered. Although the bushing of the flexible drive means has been described as being made of rubber, obviously it can be made of any synthetic elastomer having flexible property similar to that of rubber.

It should be noted that the flexible drive means, as viewed in FIGURES 2 and 3, is of a generally square shape. However, this shape is considered to be a matter of choice, the only requirement being that when the two parts of the sickle drive arm are clamped together the thin shell of the yieldable drive means must be rigidly connected to said sickle drive arm.

*Operation*

Spline shaft 23 is oscillated about a given arc. Flexible drive means 24, being non-rotatably carried by input drive shaft 23, and the sickle drive arm, being carried by flexible drive means 24, are oscillated about the same arc as is input drive shaft 23. The oscillatory movement of sickle drive arm 12 is transferred through bushing 17, fixed vertical pin 11, and knifehead 10 to the backing bar 8. The pivotal connection between the sickle drive arm and the backing bar 8 converts the oscillatory movement of sickle drive arm 12 into a reciprocating motion of the backing bar. The backing bar 8 has mounted thereon a conventional sickle 7 which cooperates with the edge plate 6 to perform the mowing operation. When the input shaft 23 reaches the end of its arc, it momentarily halts before it begins to reverse. However the weight of the counterbalance, the backing bar and the sickle, which have built up a considerable inertia, attempt to continue rotating shaft 23 in the same direction. This inertia is absorbed by the flexible drive means by allowing the sickle and counterweight to overtravel the arc of the input shaft by several degrees. This is best illustrated in FIGURE 3, which shows the flexible drive means isolated from the remaining parts of the device. In the full line showing of the flexible drive means, the spline shaft is at the end of its arc. At this point, the rubber bushing has not been deformed and the thin shell is in phase with the square hub. However, when the spline shaft comes to a stop, the thin wall continues to rotate deforming the rubber bushing as it rotates. The deformation of the rubber bushing will be at some points in compression and at others in tension. The deformation of the rubber bushing absorbs the inertia forces built up by the counterweight and the sickle and thus functions to reduce stresses in the driving mechanism and particularly the torsional stresses in the vertical drive shaft.

To change flexibility of the drive means, bolts 20 are adjusted, which alter the tension in rubber bushing 25. This same adjustment can be used to change the length of the sickle stroke.

The reciprocating motion of the sickle is reversed while the sickle is positioned within the slot of the fingers 4. This is necessary to protect the sickle during its momentary halt. By adjusting one or the other bolts 20 the reversing point of the sickle can be varied to assure its reversal while in a protected position.

If during the operation of the mower an object is encountered which the sickle cannot cut, the flexible drive means will permit the sickle to be held stationary while the input drive shaft 23 continues to oscillate. This prevents the input drive mechanism of the mower from being brought to an abrupt halt and allows the mower an opportunity to free itself.

It should be understood, of course, that the foregoing disclosure relates to only a preferred embodiment of the invention, and that numerous modifications or alterations may be made therein without departing from the spirit and scope of the invention as set forth in the appended claims.

What is claimed is:

1. In a mower of the type having a mower bar, a sickle reciprocal thereon, sickle drive means including an oscillating input shaft, a sickle drive arm connected to said sickle, means connecting said input shaft to said sickle drive arm and comprising resilient means interposed between the shaft and the arm, and adjustable means on the arms for varying the torque characteristics of the resilient means and the angular displacement between the said arm and shaft whereby adjusting the stroke length of said sickle.

2. The invention according to claim 1 and counterweight means connected to said shaft.

3. In a mower, a cutter bar, a sickle reciprocal thereon in a given plane, driving means for the sickle comprising a shaft member having an axis of oscillation generally normal to said plane, a connecting member on the sickle, arm means extending between said members and pivotally connected to one thereof, clamp means on the arm means having opposed portions embracing the other member, resilient means comprising a body of elastomer material embraced by the clamp means against said other member, and means securing said portions in positions selectively displacing said material whereby varying the disposition of the arm means transversely of said other member.

4. In a mower having a pair of cutting elements, means for reciprocating one of said elements and comprising a drive member having a substantially vertical axis of oscillation, means for oscillating said drive member, an arm connected to said one element, connecting means on the arm embracing said drive member, resilient elastomer material interposed between said connecting means and said member, said connecting means having parts adjustable to vary the compression on the material between said parts and the drive member.

5. In a mower of the type having a mower bar, a sickle reciprocal thereon, sickle drive means including an oscillating drive member, a sickle drive arm connected to the sickle, means connecting said drive member to said sickle arm and comprising resilient means interposed between the arm and the member, and means on the arm reactive against said resilient means for varying the torque characteristics thereof and varying the extent of angular displacement between the arm and the drive member whereby controlling the length of stroke of the sickle.

6. In a mower having a reciprocating sickle, drive means therefor including an oscillating driving member, an arm member connected to the sickle, clamping means connected to one of said members and embracing the other member, elastomer material interposed between said clamping means and the other member, said clamping means having a plurality of parts relatively adjustable to vary the displacement of the elastomer material with respect to said members.

7. In a mower, a cutter bar, a sickle reciprocal thereon in a generally horizontal plane, driving means for the sickle comprising a substantially vertical oscillating shaft, an arm pivotally connected at one end to said sickle, a clamp structure having one portion connected to the other end of the arm and another portion opposing and complementing the one portion and defining a shaft-receiving opening therebetween, a block of elastomer material sleeved over the shaft and embraced by the clamp structure, adjustable means securing said clamp portions to each other and disposed at opposite sides of the shaft and spaced longitudinally with respect to the sickle, said adjustable means adapted to be variably tightened to vary the displacement of said material about the shaft for thus shifting the position of the arm with respect to the shaft and moving the sickle lengthwise.

References Cited in the file of this patent

UNITED STATES PATENTS

| 2,354,710 | Simpson et al. | Aug. 1, 1944 |
| 2,824,416 | Orelind | Feb. 25, 1958 |

FOREIGN PATENTS

| 182,555 | Austria | July 11, 1955 |
| 428,683 | Great Britain | May 17, 1935 |